(12) United States Patent
Choe

(10) Patent No.: US 8,688,614 B2
(45) Date of Patent: Apr. 1, 2014

(54) INFORMATION PROCESSING SYSTEM

(75) Inventor: Howard C. Choe, Southlake, TX (US)

(73) Assignee: Raytheon Company, Waltham, MA (US)

( * ) Notice: Subject to any disclaimer, the term of this patent is extended or adjusted under 35 U.S.C. 154(b) by 1060 days.

(21) Appl. No.: 12/398,277

(22) Filed: Mar. 5, 2009

(65) Prior Publication Data
US 2009/0172507 A1 Jul. 2, 2009

Related U.S. Application Data

(63) Continuation of application No. PCT/US2008/051907, filed on Jan. 24, 2008.

(60) Provisional application No. 60/886,842, filed on Jan. 26, 2007.

(51) Int. Cl.
G06F 17/00 (2006.01)
G06N 5/02 (2006.01)

(52) U.S. Cl.
USPC .......................................................... 706/48

(58) Field of Classification Search
USPC .......................................................... 707/766
See application file for complete search history.

(56) References Cited

U.S. PATENT DOCUMENTS

| 5,842,156 | A | 11/1998 | Hong et al. | 702/179 |
| 6,014,447 | A | 1/2000 | Kohnen et al. | 381/86 |
| 6,269,324 | B1 | 7/2001 | Rakijas et al. | 702/190 |
| 6,393,137 | B1 | 5/2002 | Chen et al. | 382/103 |
| 6,829,568 | B2 | 12/2004 | Julier et al. | 702/189 |
| 7,005,981 | B1 | 2/2006 | Wade | 340/539.17 |
| 7,035,764 | B2 | 4/2006 | Rui et al. | 702/179 |
| 2003/0137444 | A1* | 7/2003 | Stone et al. | 342/30 |

FOREIGN PATENT DOCUMENTS

EP 1 596 334 11/2005 ............... G06T 7/20

OTHER PUBLICATIONS

'Distributed sensor system decision analysis using team stragies': Choe, 1992, SPIE vol. 1828 Sensor fusion V 0-8194-1029.*
Icons and Symbols—MIL—STD—2525 Symbology: Dahlgren, 2005, <www.rogercooper.com/documents/FILE_N1000508.pdf>.*
'Cognitive interoperability and decision making': Klose, 2005, IEEE, military communication conference.*
'Task sensitive user interfaces: grounding information provision within the context of the userts activity': Colineau, 2004, ACM, 1-58113-867, pp. 218-225.*
'Department of Defense Interface Standard': 2525A, 1996, Department of Defense.*
'Real time multiple object tracking and anomaly detection': Han, 2005, SPIE, Storage and Retrieval Mehtods and Applications for multimedia 2005, pp. 173-182.*

(Continued)

Primary Examiner — Kakali Chaki
Assistant Examiner — Peter Coughlan
(74) Attorney, Agent, or Firm — Cantor Colburn LLP

(57) ABSTRACT

According to one embodiment, an information processing system is coupled to a number of sensors for receiving information generated by the sensors. The information processing system generates records from the received information and binds the records in a multi-dimensional structure including a temporal dimension and another dimension including other records that share a common criterion. The information processing system compares a particular record against other records to detect an abnormality of the particular record.

23 Claims, 4 Drawing Sheets

(56) References Cited

OTHER PUBLICATIONS

'From Kinematics to Symbolics for Situation and Threat Assessment': Johnson, 1999, 0-7803-5256-4/99 Crown copyright of the commonwealth of Australia.*
Communication Pursuant to Article 94(3) EPC from EPO Substantive, for Application No. 08 728 208.3-2201, JL 53538P.EPP, dated Apr. 20, 2011; 5 pages.
Declaration Pursuant to 37 C.F.R.1.132 executed by Howard C. Choe; 2 pages, Dec. 1, 2009.
Choe, Howard C.; "Combat ID in the Maritime Domain to Reveal Contact Intent"; (white paper-redacted), submitted by Raytheon Company and submitted to Office of Naval Research, Arlington, VA;15 pages, Apr. 21, 2006.
L.Xiao, S. Boyd, S. Lall, "A Scheme for Robust Distributed Sensor Fusion Based on Average Consensus," *Information Processing in Sensor Networks*, pp. 63-70, Apr. 15, 2005.
K. Kastella, "Discrimination Gain to Optimize Detection and Classification," *IEEE Transactions on Systems, Man, and Cybernetics, Part A, Systems and Humans*, vol. 27, No. 1, pp. 112-116, Jan. 1997.
V. Krishnamurthy, D. Evans, "Hidden Markov Model Multiarm Bandits; A Methodology for Beam Scheduling in Multitarget Tracking," *IEEE Trans. Signal Process.* (pp. 2893-2908), 2001.
D. P. Bertsekas, D. Castanon, "Rollout Algorithms for Stochastic Scheduling Problems," *J. Heuristics*, pp. 1-25, 1998.
M. K. Schneider, G.L. Mealy, and F. M. Pait, "Closing the Loop in Sensor Fusion Systems; Stochastic Dynamic Programming Approaches," *Proceedings of the 2004 American Control Conf*, vol. 5, pp. 4752-4757, 2004.
R. E. Kalman, "A New Approach to Linear Filtering and Prediction Problems," *Transactions of the ASME—Journal of Basic Engineering 82(D)*, 12 pages, 1960.
M. J. Kearns, Y. Mansour, and A.Y. Ng, "A Sparse Sampling Algorithm for Near-Optimal Planning in Large Markov Decision Processes," *Proceedings of the Sixteenth International Joint Conference on Artificial Intelligence*, 8 pages, 1999.
A. Makarenko, H.F. Durrant-Whyte, "Decentralized Data Fusion and Control in Active Sensor Networks," *7th Int. Conf on Info Fusion*, 8 pages, 2004.
A. D'Costa, A. M. Sayeed, "Data Versus Decision Fusion for Distributed Classification in Sensor Networks," *Military Communications Conference*, pp. 890-894, 2003.
T. Clouquer, P. Ramanthan, K.K. Saluja, K. Wang, "Value-Fusion versus Decision-Fusion for Fault-Tolerance in Collaborative Target Detection in Sensor Networks," *Proceedings of Fourth International Conference on Information Fusio*, 6 pages, Aug. 2001.
X. Wang, G. Foliente, Z. Su, L. Ye, "Multilevel Decision Fusion in a Distributed Active Sensor Network for Structural Damage Detection," *Structural Health Monitoring*, pp. 45-58, 2006.
A. W. Stroupe, M.C. Martin, T. Balch, "Distributed Sensor Fusion for Object Position Estimation by Multi-Robot Systems," *Robotics and Automation*, pp. 1092-1098, vol. 2, 2001.
R. R. Brooks, P. Ramanthan, A. M. Sayeed, "Distributed Target Classification and Tracking in Sensor Networks," *Signal Processing Magazine, IEEE*, pp. 1163-1171, 2003.
H. Qi, X. Wang, S.S. Iyengar, K. Chakrabarty, "Multisensor Data Fusion in Distributed Sensor Networks Using Mobile Agents," *Proceedings of 5th International Conf on Information Fusion*, 6 pages, 2005.
B. Grocholsky, J.F. Durrant-White, P. Gibbens, "An Information-Theoretic Approach to Decentralized Control of Multiple Autonomous Flight Vehicles," *The University of Sydney*, 12 pages, 2000.
P. Ogren, E. Fiorelli, N.E. Leonard, "Cooperative Control of Mobile Sensor Networks; Adaptive Gradient Climbing in a Distributed Environment," *Automatic Control, IEEE Transactions*, pp. 1292-1302, 2004.
N. Xiong, P. Svensson, "Multi-Sensor Management for Information Fusion: Issues and Approaches," *Information Fusion*, vol. 3, pp. 163-186, 2002.

L.Y. Pao, N.T. Baltz, "Control of Sensor Information in Distributed Multisensor Systems," *American Control Conference*, pp. 2397-2401, 1999.
M. Chu, H. Haussecker, F. Zhao, "Scalable Information-Driven Sensor Querying and Routing for Ad Hoc Heterogeneous Sensor Networks," *International Journal of High-Performance Computing Applications*, 17 pages, 2002.
F. Zhao, J. Shin, J. Reich, "Information-Driven Dynamic Sensor Collaboration for Tracking Applications," *IEEE Signal Processing Magazine*, 8 pages, 2002.
B. Horling, R. Mailler, M. Sims, V. Lesser, "Using and Maintaining Organization in a Large-Scale Sensor Network," *Proc. of Workshop on Autonomy, Delegation, and Control*, U of Mass, 8 pages, 2003.
H. Wang, K. Yao, D. Estrin, "Information-theoretic Approaches for Sensor Selection and Placement in Sensor Networks for Target Localization and Tracking," *Journal of Communications and Networks*, pp. 438-449, 2005.
M. Rabbat, R. Nowak, "Distributed Optimization in Sensor Networks," *Proceedings of the Third Intl. Symposium on Information Processing in Sensor Networks*, 8 pages, 2004.
A. Savkin, R. Evans, E. Skafidas, "The Problem of Optimal Robust Sensor Scheduling," *paper—Australian Research Council and the Centre of Expertise in Networked Decision Systems*, 6 pages, 2000.
S. Kullback and R. A. Leibler, "On Information and Sufficiency," *The Annals of Mathematical Statistics*, pp. 79-86.
K. Kastella, "Discrimination Gain to Optimize Detection and Classification," *IEEE Transactions on Systems, Man, and Cybernetics, Par A: Systems and Humans* 7 pages, 1995.
S. Musick, K. Kastella, "Comparison of Sensor Management Strategies for Detection and Classification," *9th National Symposium on Sensor Fusion*; 23 pages, Mar. 1996.
A. Willsky, M. Bello, D. Castanon, B. Levy, G. Verghese, "Combining and Updating of Local Estimates and Regional Maps Along Sets of One-Dimensional Tracks," *Automatic Control, IEEE Transaction*, pp. 799-813, Aug. 1982.
T. H. Chung, V. Gupta, J.W. Burdick, R.M. Murray, "On a Decentralized Active Sensing Strategy Using Mobile Sensor Platforms in a Network," *Decision and Control*, 6 pages, Dec. 2004.
A. Vailaya, M.A.T. Figueiredo, A.K. Jain, Z. Hong-Jiang Zhang, "Image Classification for Context-Based Indexing," *Image Processing, IEEE Transactions*, pp. 117-130, Jan. 2001.
D. Koller, M. Sahami, "Hierarchically Classifying Documents Using Very Few Words," *Proc of the 14th Intl Conference on Machine Learning*, 9 pages, 1997.
D.J.C. MacKay, "Bayesian Interpolation," *Neural Computation*, 27 pages, May 1992.
U.S. Appl. No. 12/018,036, entitled "Information Processing System," 28 pages, Jan. 22, 2008.
Pucar, Predrag; and Norberg, Par; "Decentralized Sensor Fusion and Support Using Multiple Models," SPIE vol. 3068-XP-002407865, pp. 20-31, Jan. 1, 1997.
Coue, C.; Fraichard, Th.; Besiere, P.; and Mazer, E. Multi-Sensor Data Fusion Using Bayesian Programming: an Automative Application; Intelligent Vehicle Symposium; IEEE, pp. 442-447, Jun. 17, 2002.
Nicosevici, Tudor; Garcia, Rafael; Carreras, Marc; and Villanueva, Miguel; "A Review of Sensor Fusion Techniques for Underwater Vehicle Navigation," IEEE Techno-Ocean 04, pp. 1600-1605, Nov. 9, 2004.
Extended European Search Report for application No. 08002402.9/ patent No. 1956520, EPO, 8 pages, Jun. 2, 2009.
U.S. Appl. No. 12/027,588, entitled "Information Processing System for Classification and/or Tracking an Object," 36 pages, Feb. 7, 2008.
Tharmarasa et al., "Multitarget-Multisensor Management for Decentralized Sensor Networks," SPIE, vol. 6236, pp. 1-11.
Schmaedeke, "Information based sensor management," Paramax Systems Corporation, SPIE, vol. 1955, pp. 156-164.
McIntyre et al., "An Information Theoretic Approach to Sensor Scheduling," Dept. of Electrical and Computer Engineering, SPIE vol. 2755, pp. 304-312.
Nash, "Optimal Allocation of Tracking Resources," ORINCON Corporation, pp. 1177-1180.

(56) References Cited

OTHER PUBLICATIONS

Washburn et al., "Stochastic Dynamic Programming Based Approaches to Sensor Resource Management," Fusion Technology and Systems Division, Alphatech, Inc., 8 pages.
Hashemipour et al., "Technical Notes and Correspondence," IEEE Transactions on Automatic Control., vol. 33, No. 1, pp. 88-94, Jan. 1988.
Hintz et al., "Multi-Process Constrained Estimation," IEEE, vol. 21, No. 1, pp. 237-244, Jan./Feb. 1991.
Hintz, "A Measure of the Information Gain Attributable to Cueing," IEEE, vol. 21, No. 2, pp. 434-442, Mar./Apr. 1991.
Manyika et al., "An Information-theoretic Approach to Management in Decentralized Data Fusion," Oxford University, Robotics Research Group, Dept. of Engineering Science, SPIE vol. 1828 Sensor Fusion V, pp. 202-213, 1992.
Manyika et al., "On Sensor Management in Decentralized Data Fusion," Oxford University, Robotics Research Group, Dept. of Engineering Science, IEEE, pp. 3506-3507, Dec. 1992.
Gaskell et al., "Sensor Models and a Framework for Sensor Management," Robotics Research Group, Oxford University, SPIE vol. 2059 Sensor Fusion VI, pp. 2-13, 1993.
Schmaedeke et al., "Event-averaged maximum likelihood estimation and information based sensor management," UNISYS Government Systems Group, SPIE vol. 2232, pp. 91-96, Mar. 8, 1994.
Lopez et al., "Fuzzy Reasoning for Multisensor Management," IEEE, Dpto. Informatica, Universidad Carlos III de Madrid, pp. 1398-1403, 1995.
Malhotra, "Temporal Considerations in Sensor Management," IEEE, pp. 86-93, 1995.
"Unbiased Converted Measurements for Tracking," IEEE, pp. 1023-1027, 1998.
Mahler, "Global posterior densities for sensor management," Lockheed Martin Tactical Defense Systems, SPIE vol. 3365, pp. 252-263, Apr. 1998.
Mahler, "Multisource, multitarget filtering: A unified approach," Lockheed Martin Tactical Defense Systems, SPIE vol. 3373, pp. 296-307, Apr. 1998.
Musick et al., "A practical implementation of joint multitarget probabilities," Air Force Research Laboratory, SPIE vol. 3374, pp. 26-37, Apr. 1998.
Schmaedeke et al., "Information Based Sensor Management and IMMKF," SPIE vol. 3373, pp. 390-401, Apr. 1998.
Zhang et al., "Resource Management of Task Oriented Distributed Sensor Networks," University of Miami, IEEE, pp. 513-516, 2001.
Krishnamurthy, "Algorithms for Optimal Scheduling and Management of Hidden Markov Model Sensors," IEEE, vol. 50, No. 6, pp. 1382-1397, Jun. 2002.
Bar-Shalom et al., "One-Step Solution for the Multistep Out-of-Sequence-Measurement problem in Tracking," IEEE Transactions on Aerospace and Electronic Systems, vol. 40, No. 1, pp. 27-37, Jan. 2004.

Bonnet, P., et al., "Towards Sensor Database Systems," Mobile Data Management, Second International Conference, MDM 2001 Proceedings (Lecture Notes in Computer Science, vol. 1987) Springer-Verlag Berlin, Germany, 2001, pp. 3-12, 1987.
Chaudhuri, S., et al., "An Overview of Data Warehousing and OLAP Technology," SIGMOD Record, New York, NY, vol. 26, No. 1, Mar. 1, 1997, pp. 65-74, Mar. 1, 1997.
Alimhed-Torsten Grust et al., "Phenomenon-Aware Sensor Database Systems," Current Trends in Database Technology EDBT 2006, Lecture Notes in Computer Science, vol. 4254, Jan. 1, 2006, pp. 1-9.
Han, et al., "An Infrastructure of Stream Data Mining, Fusion and Management for Monitoried Patients," Proceedings of the 19th IEEE Symposium on Computer-Based Medical Systems, Salt Lake City, UT, Jun. 22-23, 2006, pp. 461-465.
Communication Pursuant to Article 94(3) EPC from EPO Substantive for Application No. 08 728 208.3-2201; 4 pages, Apr. 19, 2010.
USPTO Final Office Action; U.S. Appl. No. 12/027,588, filed Feb. 7, 2008, Deepak Khosla, et al.; 10 pgs, Notification Date Jan. 25, 2011.
Deepak Khosla, et al., "Response Pursuant to 37 C.F.R. §1.111," U.S. Appl. No. 12/027,588, filed Feb. 7, 2008, 15 pgs, Filed USPTO Dec. 6, 2010.
Communication Pursuant to Article 94(3) EPC from EPO Substantive, for Application No. 08 002 402.9-2218, JL 53750P.EPP, dated Jan. 31, 2011; 5 pages.
Martin Oxenham, Subhash Challa, and Mark Morelande, "Fusion of disparate identity estimates for shared situation awareness in a network-centric environment"; ScienceDirect Information Fusion 7 (2006) pp. 395-417.
Weiqun Shi, Ronald Fante, John Yoder, and Gregory Crawford, "Multi-Modal Netted Sensor Fence for Homeland Security"; the MITRE Corp., Bedford, MA, Unattended Ground Sensor Technologies and Applications VII. Edited by Carapezza, Edward M., Proceedings of SPIE vol. 5796 (2005), pp. 416-427.
Mahler, Ronald; "Global Optimal Sensor Allocation," 9th National Sensor Fusion, vol. I, pp. 347-366 (20 pgs), Mar. 13, 1996.
Intanagonwiwat, Chalermek, Givondan, Ramesh, and Estrin, Deborah; "Directed Diffusion: A Scalable and Robust Communication Parpadigm for Sensor Networks," MOBICOM 2000, Boston, MA, USA, pp. 56-67, (12 pgs), 2000.
Thomopoulos, Stelios, Viswanathan, Ramanarayanan, Bougoulias, Dimitrios, and Zhang, Lei; "Optimal and Suboptimal Distributed Decision Fusion," Dept of Electrical Engineering, Southern Illinois University, pp. 414-418 (5 pgs), 1988.
Munkres, James; "Algorithms for the Assignment and Transportation Problems," J. Soc. Indust. Appl. Math. vol. 5, No. 1, pp. 32-38 (7 pgs), Mar. 1957.
USPTO; Office Action; U.S. Appl. No. 12/027,588, filed Feb. 7, 2008, in the name of Khosla et al.; 15 pgs, Notification Date Jul. 6, 2010.

* cited by examiner

INFORMATION PROCESSING SYSTEM

RELATED APPLICATIONS

This application is a continuation under 35 U.S.C. Sections 120 and 365(c) of Patent Cooperation Treaty Patent Application No. PCT/US08/51907 filed Jan. 24, 2008 entitled "INFORMATION PROCESSING SYSTEM," which claims priority to U.S. Provisional Patent Application Ser. No. 60/886,842, entitled "COMPUTATIONAL INFORMATION PROCESSING SYSTEM," which was filed on Jan. 26, 2007.

TECHNICAL FIELD OF THE DISCLOSURE

This disclosure generally relates to processing systems, and more particularly, to an information processing system and a method of operating the same.

BACKGROUND OF THE DISCLOSURE

Intelligence, surveillance, and reconnaissance (ISR) activities refer to a generally broad classification of activities that may be performed for information gathering purposes. Various types of sensors have been developed for providing information that are used in intelligence, surveillance, and reconnaissance activities. These sensors may be any suitable device for gathering information, such as cameras, data receivers, forward looking infrared radar systems (FLIRS), tactical remote sensor systems (TRSS), and the like. For example, information provided by sensors may include one or more events that occur at a particular period of time. Using information provided by these sensors, personnel may be able to determine activities of others, such as, for example, enemy movement or activity within a given military war zone, or criminal activity in an urban area.

SUMMARY OF THE DISCLOSURE

According to one embodiment, an information processing system is coupled to a number of sensors for receiving information generated by the sensors. The information processing system generates records from the received information and binds the records in a multi-dimensional structure including a temporal dimension and another dimension including other records that share a common criterion. The information processing system compares a particular record against other records to detect an abnormality of the particular record.

Particular embodiments of the present disclosure may exhibit some, none, or all of the following technical advantages. For example, the information processing system may bind relevant information with the particular record in a similar manner to the human brain. Numerous articles in neuroscience indicate that the human brain encodes information or events such that the internal representation of external events by his/her own selective pictures based on cognitive importance in a categorical and hierarchical manner with hierarchical information extraction and parallel binding process.

Other technical advantages will be readily apparent to one skilled in the art from the following figures, description, and claims.

BRIEF DESCRIPTION OF THE DRAWINGS

A more complete understanding of embodiments of the disclosure will be apparent from the detailed description taken in conjunction with the accompanying drawings in which.

DETAILED DESCRIPTION OF EXAMPLE EMBODIMENTS

Known information processing systems often derive useful information from one or more sensors. These information processing systems may extract information from one or more sensors without knowledge of circumstances around an underlying event generating the information. This process, however, may create difficulties during post-processing to understand the cause and intent of the information provided. For example, numerous sensors configured in a particular information processing system may create a relatively large amount of information that causes a problem commonly referred to as information flooding. Information flooding may cause information loss due to the inability of users to process or decipher all available information provided by the multiplicity of sensors. The teachings of the present disclosure address the problem of information flooding.

Figure 1:
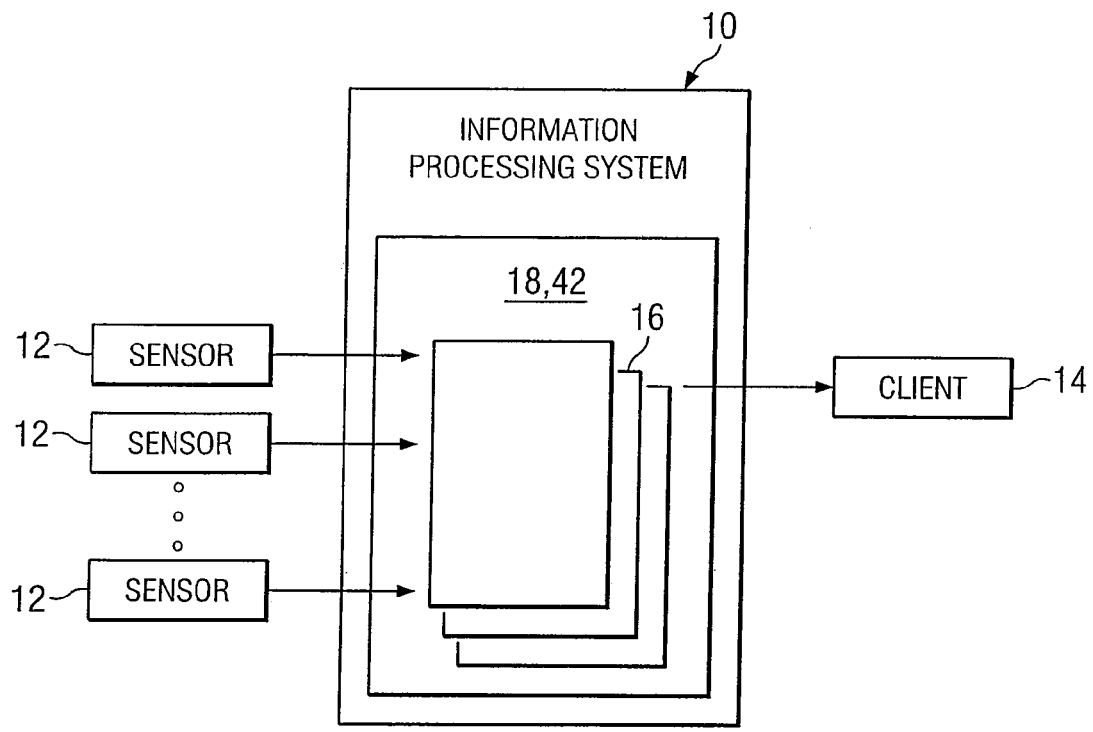
FIG. 1 is a block diagram of one embodiment of an information processing system according to the teachings of the present disclosure.

FIG. 1 shows one embodiment of an information processing system 10 that may address the previously described drawbacks of known information processing systems. Information processing system 10 is coupled to one or more sensors 12 and a client 14 as shown. Information processing system 10 generates records 16 from information provided by sensors 12. As will be described in detail below, information processing system 10 binds records 16 in a multi-dimensional data structure 18,42 for access by client 14. Multi-dimensional data structure 18, 42 has a temporal dimension including first subset of records sharing a common time period, and another dimension including a second subset of records that share a common criterion.

Organization of records 16 according to temporal and/or a common criterion may provide access to pertinent information from multiple sensors 12. In some embodiments, users may access information from other records 16 that are relevant to a particular record 16 of interest in real time. That is, records 16 may be encoded and filtered against various boundary thresholds as information from sensors 12 are received. In other embodiments, the multi-dimensional structure 18,42 of records 16 may provide for automatic generation of normalcy patterns.

Information processing system 10 may be implemented on any suitable computing system, such as a network coupled computing system or a stand-alone computing system. Examples of stand-alone computing systems may include a personal computer, a personal digital assistant (PDA), a laptop computer, or a mainframe computer. A network computing system may be a number of computers coupled together via a network, such as a local area network (LAN), a metropolitan area network (MAN), or a wide area network (WAN) that collectively execute the instructions of information processing system 10.

Information processing system 10 may receive information from any suitable type of sensors 12. For example, sensors 12 may include one or more of a signal intelligence (SIGINT) sensor, such as tactical electronic Reconnaissance Processing and evaluation system (TERPES) sensors, team portable collection system (TPCS) sensors, radio reconnaissance equipment program (RREP) sensors, tactical control and analysis center (TCAC) sensors, mobile electronic warfare support system (MEWSS) sensors, and/or communication emitter sensing attacking system (CESAS) sensors. Sensors 12 may also include imagery intelligence (IMINT) sensors, such as manpack secondary imagery dissemination system (MSIDS) sensors, tactical exploitation group (TEG) sensors, and/or firescout unmanned aircraft system (UAS) sensors. As other examples, sensors 12 may include measurement and signal intelligence (MASINT) sensors, such as tactical remote sensor system (TRSS) sensors, expeditionary tactical area surveillance system (ETASS) sensors, or critical area protection system (CAPS) sensors. Sensors may also include human intelligence (HUMANT) sensors, such as counter intelligence and HUMANT equipment program (CIHEP) sensors.

Sensors 12 convey telemetry information using any suitable approach. In one embodiment, sensors 12 may be remotely coupled to information processing system 10 using a communication protocol, such as, an Ethernet protocol. In another embodiment, sensors 12 may be coupled to information processing system through a virtual private network (VPN) configured on the Internet.

Sensors 12 as described above may provide relatively diverse information. Information processing system 10 receives information from sensors 12 generates records 16 having a common format. In one embodiment, information processing system 10 encapsulates information from sensors 12 in an extensible markup language (XML) structure. The extensible markup language is a general purpose markup language that enables formatting of disparate types of data into a common format.

Records 16 may include a tag for binding to one another. In one embodiment, binding of records 16 to one another may be provided by an alphanumeric cipher included in the XML structure. The alphanumeric cipher generally includes a string of characters that, when decrypted, provides information about various aspects of information included in its associated record 16. For example, the alphanumeric cipher may include a five byte field that indicates a time at which the information took place. Another seven byte field of the alphanumeric cipher may include longitudinal and latitude coordinates indicating the location at which the information occurred.

Information processing system 10 provides records 16 to client 14 using any suitable client-server protocol. In one embodiment, client 14 executes a geographical information system (GIS) program that associates records 16 with a particular region or location on a map. In one embodiment, information processing system 10 may provide information to client 14 in a five dimensional space: three linear dimensions, a time dimension, and a sensing modality dimension. The geographical information system program may provide layered views of a two-dimensional surface to include time, modal, or height aspects of information included in records 16.

Figure 2:
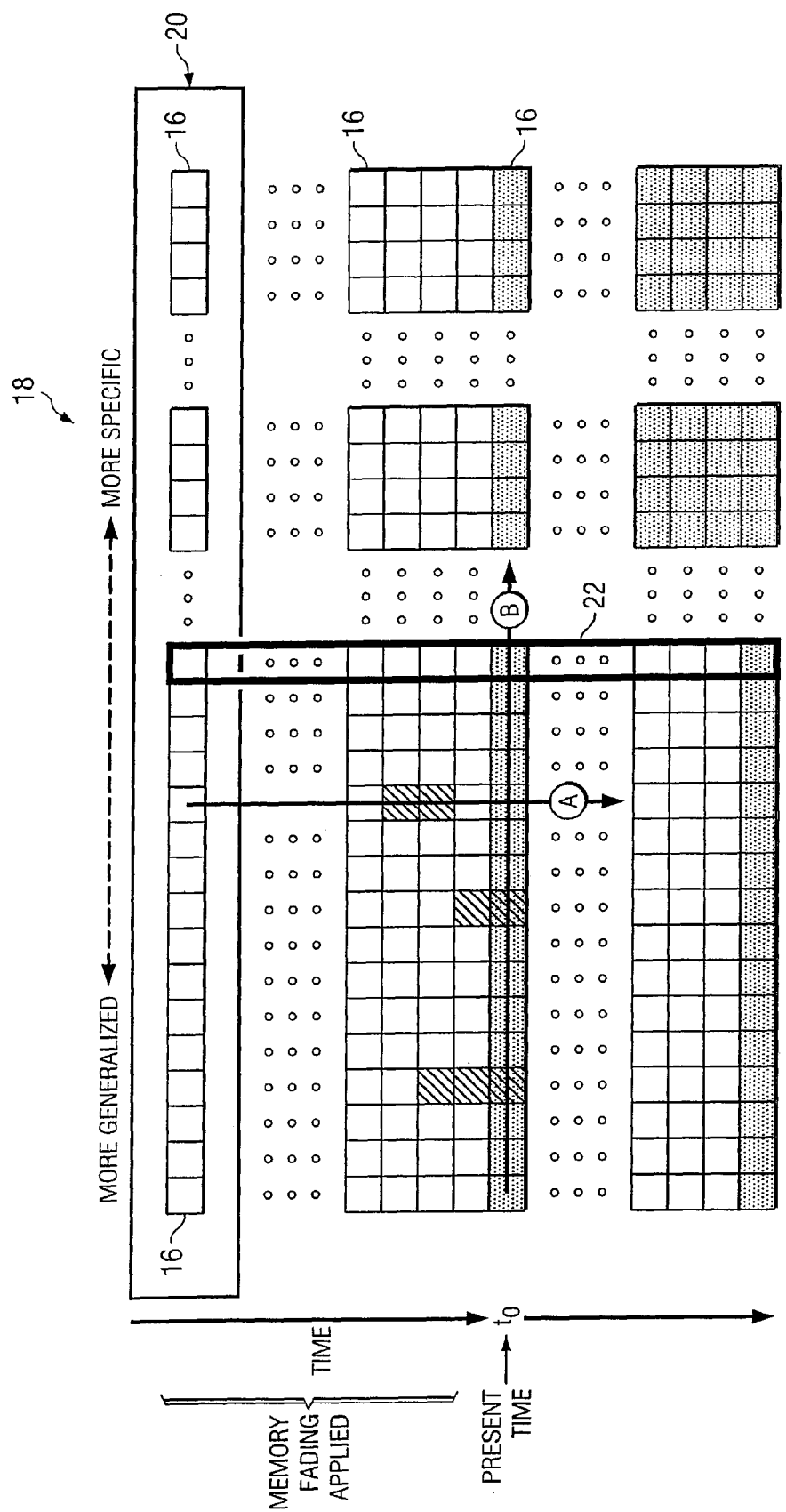
FIG. 2 is a graphical representation of one embodiment of a multi-dimensional structure of records that may be bound together by the information processing system of FIG. 1.

FIG. 2 illustrates a graphical representation of the multi-dimensional structure 18 of records 16. In this particular embodiment, information received within any particular time frame is organized in a row 20. That is, records 16 having information that may be pertinent to a particular period of time may be bound together in rows 20.

Records 16 may also be categorized in one of a number of columns 22 according to one or more criteria. For example, one column 22 may include a velocity of a particular target, and another column 22 may include its location information. These columns 22 may provide historical information about the target and allow the encoded record processing engine 36 to predict future potential changes of the target. In one embodiment, records 16 are organized in columns 22 according to a level of specificity. That is, records 16 providing more specific information may be arranged to the right of an associated record 16 as shown in the graphical representation of FIG. 2. For example, records 16 having general information, such as weather, environmental coordinates, may be arranged to the left of more specific information, such as combat identification (CID) information, entity location information, or kinematic information. As will be described below, information processing system 10 may apply a time fading process to rows 20 in the past. The time fading process applies a relevance factor to rows that reduces proportionally according to the rows historical time.

Figure 3:
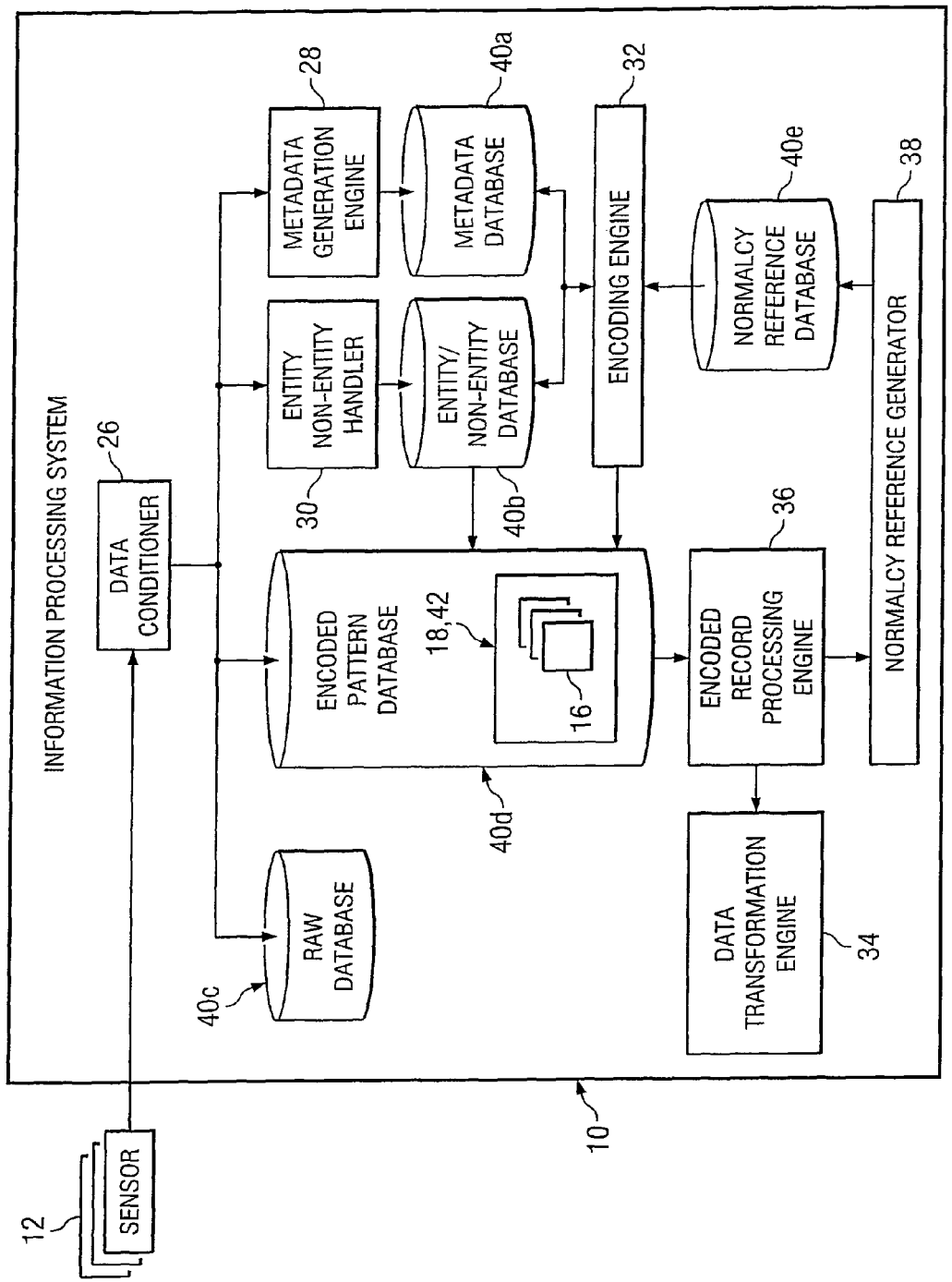
FIG. 3 is a block diagram showing several components of the information processing system of FIG. 1.

FIG. 3 is a diagram showing several components of information processing system 10. Information processing system 10 includes a data conditioner 26, a metadata generation engine 28, an entity/non-entity handler 30, an encoding engine 32, a data transformation engine 34, an encoded record processing engine 36, a normalcy reference generator 38, and several databases 40 coupled together as shown. Databases 40 may include a metadata database 40a, an entity/non-entity database 40b, a raw database 40c, an encoded pattern database 40d, and a normalcy reference database 40e that store records 16 in various forms for use by client 14.

Data conditioner 26 receives information from sensors 12 and generates records 16 according to the received information. Records 16 generated by data conditioner may be stored in raw database 40c. In one embodiment, raw database 40c is a relational database.

Data conditioner 26 conditions information received by sensors 12 into a common format. For example, data conditioner 26 transforms coordinates of geo-spatially referenced information into a common geographical reference frame. Data conditioner 26 may correlate information from identifying the same entity. In one embodiment, data conditioner 26 labels information according to a military standard 2525 (MIL-STD-2525) protocol. In another embodiment, data conditioner 26 processes textual information according to a move-to-front (MTF) transform or a North Atlantic Treaty Organization (NATO) Adat P-3 protocol. In another embodiment, data conditioner 26 includes a mass high tech (MHT) tool for group tracking and/or entity threading through temporal and spatial resolutions, uncertainty generation, and ambiguity measure. In another embodiment, data conditioner 26 includes a feature aided tracking (FAT) tool that incorporates a log-likelihood ratio process for data fitting to existing tracks, statistical distance measure using covariance, accrued probability for ambiguity detection, and/or track-to-track fusion.

Metadata generation engine 28 generates metadata records that are stored in metadata database 40a. Metadata records are an abstract form of information included in records 16 stored in raw database 40c. Metadata records may include relational indicators to records 16 stored in metadata database 40a. In this manner, each record 16 may be associated with a metadata record including an abstraction of information included in its associated record 16.

Entity/non-entity handler 30 encodes records 16 containing entity data and non-entity data. Entity data generally refers to events, such as detected objects and/or the movement of these objects. Non-entity data generally refers to imagery, weather, and scheduled routes or manifests of vessels. Entity information included in records 16 may be used by encoding engine 32 to construct bindings among associated records 16.

Encoding engine 32 encodes records 16 with other records 16 in multi-dimensional structure 18,42. Once encoded, multi-dimensional structure 18,42 is stored in encoded pattern database 40d. Encoding engine 32 generates the alphanumeric cipher for records 16 continuously over time or updates the cipher associated records 16 depending on entity and event types of information included in record 16. When relevant data is missing, encoding engine 32 may search for or derive the missing data to fill the gap. That is, encoding engine 32 derives records 16 according to past or future events due to measurement latency or future scheduled events, respectively. For example, encoding engine 32 may derive a record 16 having a future scheduled route to be contemporaneous with a future time frame of other records 16. In this case, encoding engine 32 binds the record 16 of the scheduled route with other records 16 at the future time.

Encoded record processing engine 36 analyzes information in the multi-dimensional structure of records 16 generated by encoding engine 32. Encoded record processing engine 36 may perform historical pattern analyses of a particular record's 16 history A (FIG. 2) to detect an abnormality. Encoded record processing engine 36 may also analyze the relationship B (FIG. 2) among records 16 to detect an abnormality. Encoded record processing engine 36 may analyze the multivariate or multidimensional pattern aspects of multiple adjacent records 16 for modeling and detecting normalcy and abnormality of the information.

In one embodiment, encoded record processing engine 36 may detect an abnormality using preset thresholds for specific boundaries. Referring to FIG. 2, records 16 exceeding preset thresholds are represented by darkened cells. The thresholds can be partitioned by geo-politics, doctrine, rules of engagement (ROE) for situation awareness and enforcement, and by ports/waterways, coastal, approach, and high seas zones for state protection, and around an entity for protection of a particular geographical region.

Data transformation engine 34 provides records 16 associated with encoded information to client 14. Data initially presented to client 14 from encoded record processing engine 36 may be encoded by encoding engine 32. Upon request from client 14, data transformation engine 34 retrieves records 16 associated with encoded information and transmits these records 16 to client 14.

Normalcy reference generator 38 generates normalcy references used by encoded record processing engine 36 to detect abnormalities. Normalcy references used by encoded record processing engine 36 may be stored in normalcy reference database 40e. Normalcy references generally include seed information that indicates normalcy patterns to be used by encoded record processing engine 36. This seed information may include threshold values for abnormalcy detection.

Figure 4:
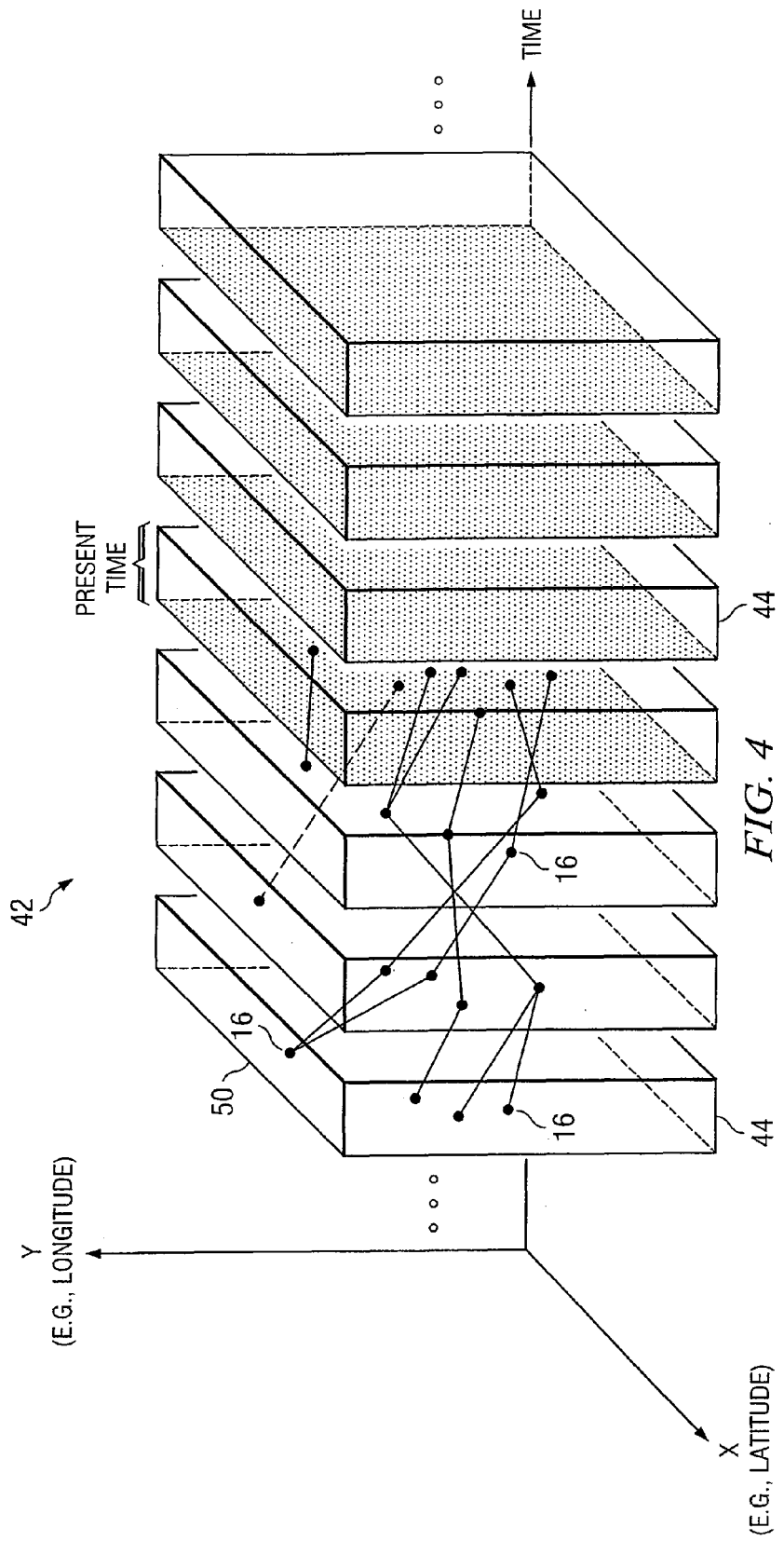
FIG. 4 is a graphical representation of another embodiment of a multi-dimensional structure of records that may be bound together by the information processing system of FIG. 1.

FIG. 4 shows another embodiment of a multi-dimensional structure 42 of records 16 that may be bound together according to periodic changes in normalcy reference generator 38. Information processing system 10 binds records 16 together in time resolution cells 44 that may be multi-dimensional in form. Rather than maintaining records 16 at a particular instant of time, records 16 may be associated with other records 16 as the context of normalcy changes. This approach is modeled after human thought processes in which time is represented in an exact sense, rather in abstract sense, especially for past and future events. This approach deals with any time resolution requested by events occurring in the past, present, future, and/or any tense combination. In one embodiment, time resolution cells 44 may be further divided to shorter cells, or multiple time resolution cells merged to give a longer time resolution cell 44.

Lines between records 16 represent correlations performed by encoded record processing engine 36 due to changing normalcy references provided by normalcy reference generator 38. Information correlation of this type is referred to as temporal multi-resolution correlation. Normalcy reference generator 38 correlates records 16 having information that arrives asynchronously, out-of-sequence, with latencies, with data content spanning varying time resolution, with very diverse data types, and/or varying formats.

Modifications, additions, or omissions may be made to information processing system 10 without departing from the scope of the disclosure. Moreover, information processing system 10 may comprise more, fewer, or other elements. For example, data conditioner 26 may include any suitable tool for conditioning information received from sensors 12. As used in this document, "each" refers to each member of a set or each member of a subset of a set.

Figure 5:
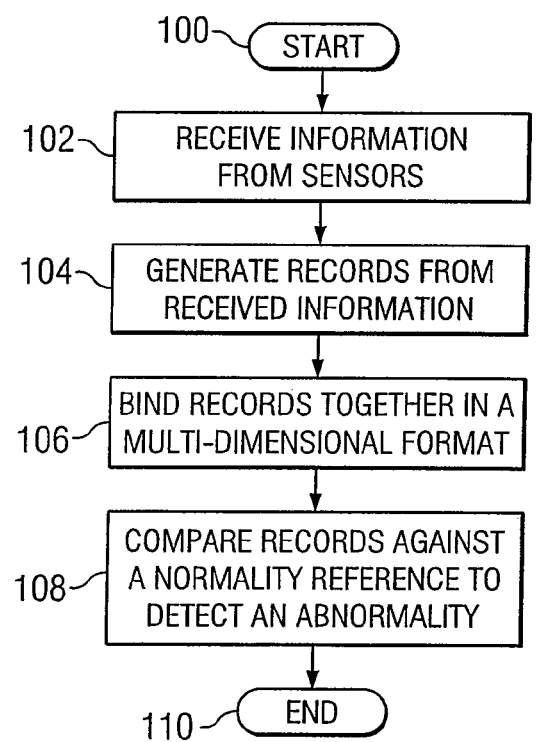
FIG. 5 is a flowchart showing one embodiment of a series of actions that may be performed by the information processing system of FIG. 1.

FIG. 5 is a flowchart showing one embodiment of a series of actions that may be performed by information processing system 10. In act 100, the process is initiated.

In act 102, information processing system 10 receives information from a number of sensors 12 and translates information to a common format using data conditioner 26.

In act 104, information processing system 10 generates records 16 from the received information. Information processing system 10 may also generate metadata and entity/non-entity data for each generated record 16. In one embodiment, records are encapsulated in an extensible markup language (XML) format. In another embodiment, each record 16 includes an alphanumeric cipher comprising encrypted string of various aspects of the included information.

In act 106, information processing system 10 binds records 16 together in a multi-dimensional structure having a temporal dimension and one or more additional dimensions according to one or more criteria. Records 16 sharing a common time period with one another may be bound according to the temporal dimension. Records 16 sharing the common criteria may be bound in another dimension. In one embodiment, records 16 are bound together according to their associated alphanumeric cipher.

Information processing system 10 may derive information for inclusion in records 16 if relevant data is missing. That is, missing data within the multi-dimensional structure may be replaced with derived data from other relevant sources of information.

In act 108, information processing system 10 compares records 16 against one another using a normalcy reference to detect an abnormality. If detected, an alarm may be transmitted to client 14. In one embodiment, a normalcy reference generator 38 is included that updates the normalcy reference on an as needed or periodic basis.

Acts 102 through 108 may be repeatedly performed by information processing system 10 to detect abnormalities of information received from sensors 12. When operation of information processing system 10 is no longer needed or desired, the process ends in act 110.

Modifications, additions, or omissions may be made to the method without departing from the scope of the disclosure. The method may include more, fewer, or other steps. For example, the described method uses normalcy references generated on an as needed or periodic basis. In other embodiments, updated normalcy references may be updated according to patterns of specific information requested from client 14.

Although several embodiments have been illustrated and described in detail, it will be recognized that substitutions and alterations are possible without departing from the spirit and scope of the present disclosure, as defined by the following claims.

What is claimed is:

1. A computing system comprising:
an information processing system coupled to a plurality of sensors, the information processing system operable to:
receive information from the plurality of sensors;
generate a plurality of records from the received information, each of the plurality of records comprising an alphanumeric cipher;
bind, using the alphanumeric cipher, a first record of the plurality of records to a first subset of the plurality of records, the first subset sharing a common time period with the first record;
bind, using the alphanumeric cipher, the first record to a second subset of the plurality of records that share a common criterion with the first record, the second subset being organized according to a level of specificity, wherein organization of the second subset with respect to the first subset indicates historical information of the first record; and
detect an abnormality of the first record by comparing the first record with the first subset or the second subset,
wherein the information processing system is configured to organize the second subset of records according to a level of specificity, is configured to apply a time fading factor to each record, the time fading factor indicative of a relevancy of the record that reduces proportionally with respect to the historical information, and is configured to automatically generate a normalcy pattern based on the relevancy of the records such that users may access information from at least one first record that is relevant to a second record of interest in real time.

2. The computing system of claim 1, wherein the plurality of records are stored in an extensible markup language (XML) structure.

3. A computing system comprising:
an information processing system coupled to a plurality of sensors, the information processing system operable to:
receive information from the plurality of sensors;
generate a plurality of records from the received information;
bind a first record of the plurality of records to a first subset of the plurality of records, the first subset sharing a common time period with the first record;
bind the first record to a second subset of the plurality of records that share a common criterion with the first record, the binding of the first record to the first and second subsets generating a cross-reference indicating historical information of the first record; and
detect an abnormality of the first record by comparing the first record with the first subset or the second subset,
wherein the information processing system is configured to organize the second subset of records according to a level of specificity, is configured to apply a time fading factor to each record, the time fading factor indicative of a relevancy of the record that reduces proportionally with respect to the historical information, and is configured to automatically generate a normalcy pattern based on the relevancy of the records such that users may access information from at least one first record that is relevant to a second record of interest in real time.

4. The computing system of claim 3, wherein the information processing system is operable to generate an alphanumeric cipher for each of the plurality of records, the alphanumeric cipher binding the first record to the first subset and the second subset.

5. The computing system of claim 3, wherein the common criterion is a geo-spatial criterion.

6. The computing system of claim 3, wherein the information processing is operable to compare the first record with the first subset using a fading process.

7. The computing system of claim 3, wherein the plurality of records are stored in an extensible markup language (XML) structure.

8. The computing system of claim 3, wherein the information processing system is operable to translate information from the plurality of sensors into a common format.

9. The computing system of claim 3, wherein the information processing system comprises a normalcy reference generator that generates the common criterion.

10. The computing system of claim 3, wherein the information processing system is operable to predict a future event of the first record according to historical information of the second subset.

11. The computing system of claim 3, wherein the information processing system is operable to detect the abnormality of the first record by comparing the first record against one or more boundary thresholds.

12. The computing system of claim 3, wherein the information processing system is operable to derive information according to other information in the first subset or the second subset and store the derived information in the first record.

13. A method comprising:
receiving information in a processor from a plurality of sensors;
generating a plurality of records from the received information;
binding a first record of the plurality of records to a first subset of the plurality of records, the first subset sharing a common time period with the first record; and
binding the first record to a second subset of the plurality of records that share a common criterion with the first record;
generating a cross-reference indicating historical information of the first record based on the binding of the first record to the first and second subsets; and
detecting an abnormality of the first record by comparing the first record with the first subset or the second subset,
organizing the second subset of records according to a level of specificity;
applying a time fading factor to each record, the time fading factor indicative of a relevancy of the record that reduces proportionally with respect to the historical information; and
automatically generate a normalcy pattern based on the relevancy of the records such that users may access information from at least one first record that is relevant to a second record of interest in real time.

14. The method of claim 13, wherein binding the first record to the second subset further comprises binding the first record to the second subset according to a level of specificity, and applying a time fading factor to each record, the time fading factor indicative of a relevancy of the record that reduces proportionally with respect to the historical information.

15. The method of claim 13, wherein binding the first record to the first subset and the second subset further comprises binding the first record to the first subset and the second subset using an alphanumeric cipher.

16. The method of claim 13, wherein binding the first record to a second subset of the plurality of records that share a common criterion further comprises binding the first record to a second subset of the plurality of records that share a geo-spatial criterion.

17. The method of claim 13, wherein comparing the first record with the first subset further comprises comparing the first record with the first subset using a fading process.

18. The method of claim 13, further comprising storing the plurality of records in an extensible markup language (XML) structure.

19. The method of claim 13, further comprising translating information from the plurality of sensors into a common format.

20. The method of claim 13, further comprising generating the common criterion using seed information.

21. The method of claim 13, further comprising predicting a future event of the first record according to historical information of the second subset.

22. The method of claim 13, wherein detecting the abnormality of the first record by comparing the first record against one or more boundary thresholds.

23. The method of claim 13, further comprising deriving information according to other information in the first subset or the second subset, and storing the derived information in the first record.

* * * * *